United States Patent Office 2,900,382
Patented Aug. 18, 1959

2,900,382
METHOD OF MAKING Δ⁴,⁶ STEROID COMPOUNDS FROM Δ⁴ STEROID COMPOUNDS

Franz Sondheimer and George Rosenkranz, Mexico City, Mexico, assignors, by mesne assignments, to Syntex S.A., Mexico City, Mexico, a corporation of Mexico No Drawing. Application June 25, 1953
Serial No. 364,184

Claims priority, application Mexico June 28, 1952

9 Claims. (Cl. 260—239.55)

The present invention relates to a novel method for the preparation of cyclopentanophenanthrene derivatives. More particularly, the present invention relates to the preparation of steroidal unsaturated ketone compounds by oxidation reactions with manganese dioxide.

In the United States application of Sondheimer, Romo, Rosenkranz and Djerassi, Serial Number 344,246, filed March 23, 1953, there is disclosed the oxidation of steroidal α,β unsaturated alcohols to the corresponding ketones with manganese dioxide or Ramey nickel in the presence of a hydrogen acceptor. The aforementioned application also discloses the selective oxidation of α, β unsaturated alcohols leaving other alcohol groups generally intact, and especially the oxidation of Δ⁴-3-hydroxy compounds to the corresponding Δ⁴-3-keto compounds.

In United States Patents Numbers 2,311,102 to Wettstein and 2,332,815 to Ruzicka, there are disclosed methods for the production of steroidal Δ⁴,⁶-3-ketones. The methods there described are relatively complicated and the desired compounds are produced in relatively low yields. Further, the methods there described are not altogether satisfactory where the steroidal compound possesses the characteristic side chain of the cortical hormones.

In accordance with the present invention the surprising discovery has been made, that manganese dioxide treatment of β,γ-unsaturated alcohols produces doubly unsaturated ketones having double bonds at the α,β and γ,δ positions.

Further, in accordance with the present invention, it has been discovered that Δ⁴,⁶-3-ketone steroidal compounds may be produced in good yield from Δ⁵-3-hydroxy compounds and that Δ⁴,⁶-3-ketones can also be prepared from Δ⁴-3-hydroxy compounds or from Δ⁴-3-ketones by reacting these compounds with manganese dioxide under reflux conditions.

It has further been discovered in accordance with the present invention that steroidal β,γ-unsaturated α,δ-dihydroxy compounds, more specifically steroidal Δ⁴-3,6-diols when reacted with manganese dioxide at approximately room temperatures produced the corresponding steroidal β,γ-unsaturated α-hydroxy δ-keto compounds, specifically Δ⁴-6-ol-3-ketones. On the other hand, reaction with manganese dioxide under hot conditions, i.e. reflux, produces from the same compounds the α,γ-diketones, for example, Δ⁴-3,6-diketones.

Further, it has been discovered in accordance with the present invention that when manganese dioxide is reacted with steroidal Δ⁵-7-ol compounds, these compounds are converted to the corresponding steroidal Δ⁵-7-ketones and when Δ¹⁶-20-ol steroidal compounds are reacted with manganese dioxide the corresponding Δ¹⁶-20-ketones are produced. In general, it may be stated that these various reactions of manganese dioxide upon allylic alcohols or upon β,γ-unsaturated alcohols can be carried out in the presence of saturated alcohol groups which remain substantially unaffected by the reagent.

A portion of the process of the present invention may be illustrated by the following equation:

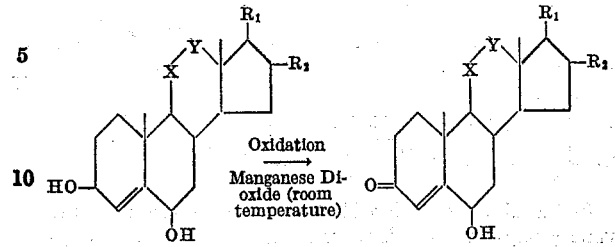

In the above equation X and Y may represent known substituents in positions C-11 and C-12 of ring C of the steriod molecule, i.e. X may be CH₂,

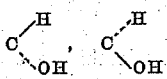

C=O or

Y may be CH₂,

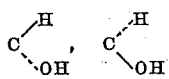

or C=O. If R₂ is hydrogen then R₁ represents known C-17 side chains such as =O,

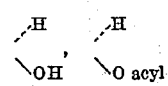

alkyl, alkylene, oxy-alkyl, ketone-alkyl, carboxy-alkyl, carbalkoxy-alkyl, acetyl, alkoxy-alkyl, acyloxy-acetyl and acyloxy-acetyl together with a 17α-hydroxy group. R₁ and R₂ together may also represent the sapogenin side chains:

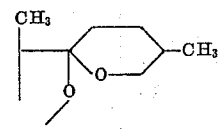

or

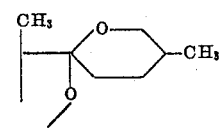

In practicing the process above set forth the steroidal Δ⁴-3,6-diol such as Δ⁴-cholesten-3β,6β-diol is dissolved in a suitable organic solvent such as chloroform, manganese dioxide added and the mixture agitated at room temperature for a prolonged period, such as one day. Purification gave a steroidal Δ⁴-6-ol-3-ketone product such as Δ⁴-cholesten-6β-ol-3-one.

The same compounds treated under reflux or with heating to substantially reflux temperatures gave the steroidal Δ⁴-3,6-diketones as a product in accordance with the following equation:

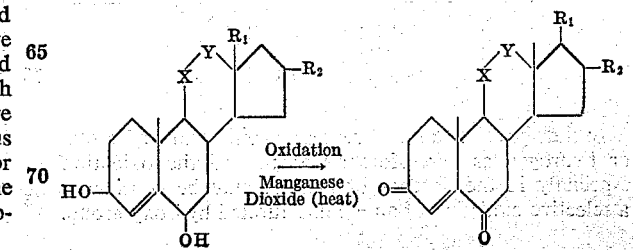

In the above equation X, Y, R and $R_1$ represent the same substituent groups as heretofore set forth.

The oxidation of steroidal $\Delta^5$-7-ol compounds including the selective oxidation of $\Delta^5$-3,7-diols is illustrated by the following equation:

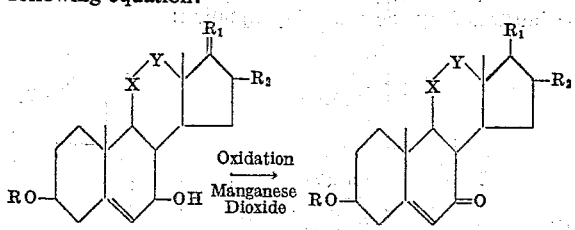

In the above equation X, Y, R and $R_1$ represent the same groups as heretofore set forth and R represents hydrogen or an acyl group such as the residue of a lower fatty acid or benzoid acid.

The production of steroidal $\Delta^{4,6}$-3-keto compounds from the corresponding steoidal $\Delta^5$-3-ol compounds, or steroidal $\Delta^4$-3-ol or steroidal $\Delta^4$-3-one compounds by treatment with manganese dioxide preferably in a suitable organic solvent under reflux conditions is illustrated by the following equation:

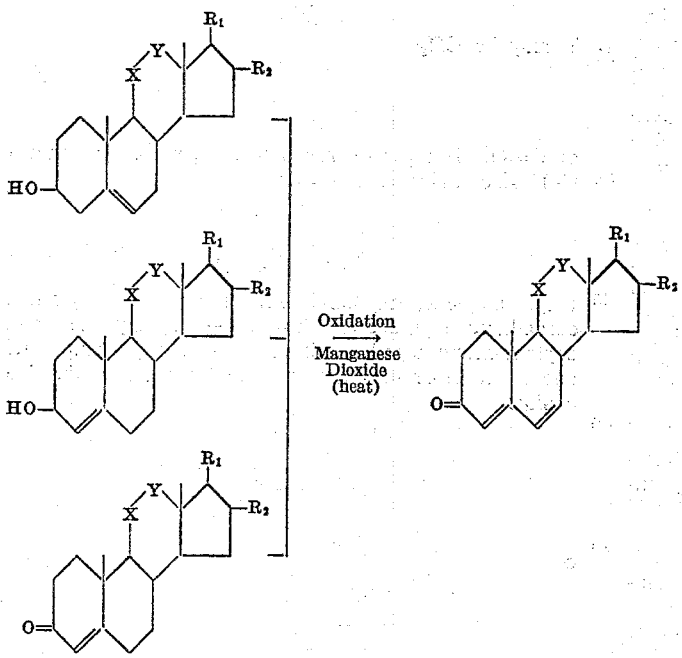

In the above equation X, Y, $R_1$ and $R_2$ represent the same groups as heretofore.

The oxidation of a steroidal $\Delta^{16}$-20-hydroxy compound to a 20-keto compound is illustrated by the following equation:

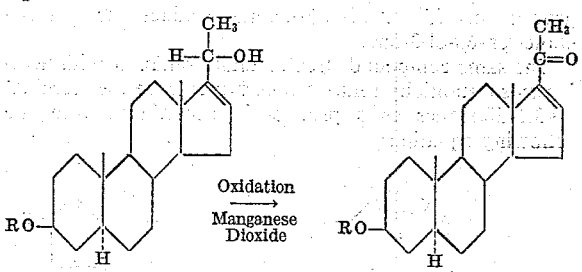

In the above equation R represents either an acyl group or hydrogen as heretofore set forth and the oxidation especially in the absence of heating may be considered a selective oxidation of an $\alpha,\beta$ unsaturated hydroxy group.

The following specific examples serve to illustrate but are not intended to limit the present invention:

Example I 20 g. of manganese dioxide were added to a solution of 1 g. of $\Delta^4$-cholesten-3$\beta$,6$\beta$-diol in 600 cc. of chloroform and the mixture was shaken at room temperature during 24 hours. The solution was filtered and evaporated to dryness. Crystallization of the residue from chloroform-acetone yielded 730 mg. of $\Delta^4$-cholesten-6$\beta$-ol-3-one with a melting point of 193°–195° C., $[\alpha]_D$ +33° (chloroform). The compound has an ultraviolet absorption maximum at 238 m$\mu$ (log E 4.26). The infrared spectrum confirms the presence of a hydroxy group as well as a $\Delta^4$-3-keto group.

Example II 20 g. of manganese dioxide were added to a solution of 1 g. of $\Delta^4$-cholesten-3$\beta$,6$\beta$-diol in 600 cc. of chloroform and the mixture was refluxed under stirring for six hours. The solution was filtered and evaporated to dryness and the residue was chromatographed in a column with 50 g. of alumina previously washed. The chromatographic fractions with similar melting points were combined and yielded 460 mg. of $\Delta^4$-cholesten-3,6-dione, which after crystallization from methanol had a melting point of 122°–124° C. $[\alpha]_D$ —29° (chloroform); $\lambda$ max. 250 m$\mu$ (log E 4.17). In contrast with the product obtained in accordance with Example I, this compound did not show in the infrared the characteristic band of free hydroxy groups.

Example III 5 g. of manganese dioxide were added to a solution of 500 mg. of $\Delta^5$-22-isospirosten-3$\beta$,7$\alpha$-diol 3-monoacetate in 50 cc. of benzene and the mixture was shaken for 24 hours at room temperature. The solution was filtered and evaporated to dryness and the residue was crystallized from methanol giving 240 mg. of $\Delta^5$-22-isospirosten-3$\beta$-ol-7-one acetate (7-keto-diosgenin acetate) with a melting point of 198°–200° C., $[\alpha]_D$ —153° (chloroform); $\lambda$ max. 236 m$\mu$, (log E 4.22). The infrared spectrum showed the presence of acetate and unsaturated keto groups. The identity of the product was established by comparison with an authentic sample of 7-keto-diosgenin; there was no depression in the mixed melting point.

Example IV

A solution of 500 mg. of $\Delta^{16}$-allopregnen-3$\beta$,20$\beta$-diol in 50 cc. of benzene was mixed with 5 g. of manganese dioxide and then shaken at room temperature for 24 hours. The solution was filtered and evaporated to dryness. The crude product exhibited an ultraviolet absorption maximum at 236 m$\mu$ (log E 3.7) thus indicating a 50% conversion to the $\Delta^{16}$-20-ketone, i.e. $\Delta^{16}$-allopregnen-3$\beta$-ol-20-one.

Example V 15 g. of manganese dioxide were added to a solution of 1.5 g. of $\Delta^5$-22-isospirosten-3$\beta$-ol in 150 cc. of benzene and the mixture was refluxed with stirring for eight hours. The solution was filtered and evaporated to dryness. Chromatographic purification of the product in a column with washed alumina yielded 460 mg. of $\Delta^{4,6}$-22-isospirostadien-3-one with a melting point of 204°–210° C., $\lambda$ max. 284 m$\mu$ (log E 4.54), identical with an authentic sample. A considerable amount of starting material was recovered from the mother liquors.

Example VI 15 g. of manganese dioxide were added to a solution of 1.5 g. of cholesterol in 150 cc. of benzene and the mixture was refluxed for eight hours under continuous stirring. Chromatographic purification of the product afforded 330 mg. of $\Delta^{4,6}$-cholestadien-3-one with a melting point of 73°–76° C. The analytical sample was obtained by crystallization from methanol, melting point 79°–81° C., $[\alpha]_D+31°$ chloroform); $\lambda$ max. 284 m$\mu$ (log E 4.53). A considerable amount of starting material was recovered from the mother liquors.

Example VII 15 g. of manganese dioxide were added to a solution of 1.5 g. of dehydroepiandrosterone in 150 cc. of benzene and the mixture was refluxed for eight hours with stirring. The yield of $\Delta^{4,6}$-androstadien-3,7-dione was 570 mg., with a melting point of 170°–173° C. The analytical sample crystallized from ether-acetone and had a melting point of 172°–173° C., $[\alpha]_D+134°$ (chloroform); $\lambda$ max. 282 m$\mu$ (log E 4.52), identical to an authentic sample. As in previous cases, a good part of the starting material was recovered.

Example VIII

Following the procedure described in Example VII, 1.5 g. of $\Delta^5$-pregnen-3$\beta$-ol-20-one yielded 500 mg. of $\Delta^{4,6}$-pregnadien-3,20-dione. After crystallization from acetone, the analytical sample had a melting point of 145°–146° C., $[\alpha]_D+179°$ (chloroform); $\lambda$ max. 284 m$\mu$ (log E 4.55), identical to an authentic sample.

Example IX

By the method described in Example VII, 1.5 g. of $\Delta^5$-21-acetoxy pregnen-3$\beta$-ol-20-one afforded 316 mg. of $\Delta^{4,6}$-21-acetoxypregnadien-3,20-dione (6-dehydro-desoxycorticosterone acetate). After crystallization from acetone its analytical sample had a melting point of 114°–115° C., $[\alpha]_D+170°$ (chloroform); $\lambda$ max. 284 m$\mu$ (log E 4.54).

Example X 15 g. of manganese dioxide were added to a solution of 1.5 g. of $\Delta^5$-androsten-3$\beta$,17$\beta$-diol in 150 cc. of benzene and the mixture was refluxed for eight hours under continuous stirring. Chromatographic purification of the product over alumina yielded:

(a) 160 mg. of $\Delta^{4,6}$-androstadien-3,17-dione with a melting point of 170°–173° C., $\lambda$ max. 284 m$\mu$ (log E 4.52), identical to an authentic sample.

(b) 230 mg. of $\Delta^{4,6}$-androstadien-17$\beta$-ol-3-one (6-dehydrotestosterone), whose analytical sample crystallized from acetone, melting point 208°–211° C., $[\alpha]_D+73°$ (chloroform); $\lambda$ max. 284 m$\mu$ (log E 4.55).

(c) Unaltered starting material.

Example XI 1.5 g. of $\Delta^5$-pregnen-3$\beta$,20$\beta$-diol were treated by the method described in Example VII and yielded 520 mg. of $\Delta^{4,6}$-pregnadien-20$\beta$-ol-3-one, whose analytical sample was prepared by crystallization from chloroform-acetone. It had a melting point of 197°–199° C., $[\alpha]_D+15°$ (chloroform); $\lambda$ max. 284 m$\mu$ (log E 4.52).

Example XII 1.5 g. of $\Delta^{5,16}$-pregnadien-3$\beta$,20$\beta$-diol was treated by the method described in Example VII and yielded 400 mg. of $\Delta^{4,6,16}$-pregnatrien-3,20-dione. Its analytical sample crystallized from chloroform-acetone and had a melting point of 253°–256° C., $[\alpha]_D+144°$ (chloroform); $\lambda$ max. 240 m$\mu$ (log E 4.21) and 284 m$\mu$ (log E 4.53).

Example XIII 1.5 g. of $\Delta^4$-22-isospirosten-3$\beta$-ol were treated by the method of Example VII and yielded 390 mg. of $\Delta^{4,6}$-22-isospirostadien-3-one whose analytical sample was crystallized from acetone-ether and had a melting point of 210°–212° C., $[\alpha]_D-56°$ (chloroform); $\lambda$ max. 284 m$\mu$ (log E 4.50). The substance was identical to an authentic sample.

Example XIV 15 g. of manganese dioxide were added to a solution of 1.5 g. of $\Delta^4$-22-isospirosten-3-one (diosgenone) in 150 cc. of benzene and the mixture was refluxed for six hours with stirring. After filtering and evaporating to dryness a substance was obtained with $\lambda$ max. 242 m$\mu$ (log E 3.92) and 284 m$\mu$ (log E 4.08) which is the characteristic spectrum of a mixture of starting material and $\Delta^{4,6}$-22-isospirostadien-3-one. The separation of the components of the mixture was achieved after repeated chromatographic purifications.

We claim:

1. A process for the production of $\Delta^{4,6}$-cholestadien-3-one comprising oxidizing cholesterol with manganese dioxide by heating in an organic solvent under reflux conditions.

2. A process for the production of $\Delta^{4,6}$-androstadien-3-one comprising oxidizing dehydroepiandrosterone with manganese dioxide by heating in an organic solvent under reflux conditions.

3. A process for the production of $\Delta^{4,6}$-pregnadien-3,20-dione comprising oxidizing $\Delta^5$-pregnen-3$\beta$-ol-20-one with manganese dioxide by heating in an organic solvent under reflux conditions.

4. A process for the production of $\Delta^{4,6}$-21-acetoxypregnadien-3,20-dione comprising oxidizing $\Delta^5$-21-acetoxypregnan-3$\beta$-ol-20-one with manganese dioxide by heating in an organic solvent under reflux conditions.

5. A process for the production of $\Delta^{4,6}$-androstadien-17$\beta$-ol-3-one comprising oxidizing $\Delta^5$-androsten-3$\beta$,17$\beta$-diol with manganese dioxide by heating in an organic solvent under reflux conditions.

6. A process for the production of $\Delta^{4,6,16}$-pregnatrien-3,20-dione comprising oxidizing $\Delta^{5,16}$-pregnen-3$\beta$,20$\beta$-diol with manganese dioxide by heating in an organic solvent under reflux conditions.

7. A process for the production of $\Delta^{4,6}$-22-isospirostadien-3-one comprising oxidizing $\Delta^4$-22-isospirosten-3-ol with manganese dioxide by heating in an organic solvent under reflux conditions.

8. A process for the production of $\Delta^{4,6}$-22-isospirostadien-3-one comprising oxidizing $\Delta^4$-22-isospirosten-3-one with manganese dioxide by heating in an organic solvent under reflux conditions.

9. A process for the production of a steroidal compound selected from the class consisting of a $\Delta^{4,6}$-3-keto cholestadiene, a $\Delta^{4,6}$-3-keto pregnadiene, a $\Delta^{4,6}$-3-keto androstadiene and a $\Delta^{4,6}$-3-keto spirostadiene which comprises heating with manganese dioxide in an organic solvent and under reflux conditions a corresponding compound selected from the class consisting of a $\Delta^4$-3-keto cholestene, a $\Delta^4$-3-hydroxy cholestene, a $\Delta^5$-3-hydroxy cholestene, a $\Delta^4$-3-keto pregnene, a $\Delta^4$-3-hydroxy pregnene, a $\Delta^5$-3-hydroxy pregnene, a $\Delta^4$-3-keto androstene, a $\Delta^4$-3-hydroxy androstene, a $\Delta^5$-3-hydroxy androstene, a $\Delta^4$-3-keto spirostene, a $\Delta^4$-3-hydroxy spirostene and a $\Delta^5$-3-hydroxy spirostene.

No references cited.